(12) United States Patent
Fries

(10) Patent No.: US 9,944,003 B2
(45) Date of Patent: Apr. 17, 2018

(54) METHOD AND DEVICE FOR PRODUCING A PLASTIC PART, ESPECIALLY A PLASTIC PART FOR AN AUTOMOBILE, BY AN INJECTION MOLDING METHOD

(71) Applicant: ILLINOIS TOOL WORKS INC., Glenview, IL (US)

(72) Inventor: Elmar Fries, Roettingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 331 days.

(21) Appl. No.: 14/413,735

(22) PCT Filed: Jun. 18, 2013

(86) PCT No.: PCT/IB2013/001273
§ 371 (c)(1),
(2) Date: Jan. 9, 2015

(87) PCT Pub. No.: WO2014/013304
PCT Pub. Date: Jan. 23, 2014

(65) Prior Publication Data
US 2016/0016343 A1    Jan. 21, 2016

(30) Foreign Application Priority Data
Jul. 17, 2012 (DE) .......................... 10 2012 014 013

(51) Int. Cl.
*B29C 45/17*    (2006.01)
*B29C 45/73*    (2006.01)
(Continued)

(52) U.S. Cl.
CPC ...... *B29C 45/1704* (2013.01); *B29C 35/0261* (2013.01); *B29C 45/7337* (2013.01);
(Continued)

(58) Field of Classification Search
None
See application file for complete search history.

(56) References Cited

U.S. PATENT DOCUMENTS

| 4,990,083 A | 2/1991 | Bernhardt |
| 5,705,201 A * | 1/1998 | Ibar ....................... B29C 45/568 |
| | | 264/572 |

(Continued)

FOREIGN PATENT DOCUMENTS

| CN | 101801628 A | 8/2010 |
| DE | 102007001756 A1 | 7/2008 |

(Continued)

OTHER PUBLICATIONS

IPRP for PCT/IB2013/001273 dated Jan. 20, 2015.
ISR for PCT/IB2013/001273 dated Dec. 4, 2013.

*Primary Examiner* — Monica Huson
(74) *Attorney, Agent, or Firm* — Hauptman Ham, LLP

(57) ABSTRACT

The invention relates to a method for producing a plastic part, especially a plastic part for an automobile, by an injection molding method comprising the steps: Using an injection molding device, plastic in a flowable state is injected into the mold cavity of an injection mold, gas under pressure is injected through a gas inlet opening in the injection mold into the mold cavity of the injection mold by means of a gas injection device so that a gas bubble forms within the still flowable plastic, the plastic is heated and kept flowable, at least in a region neighboring the gas inlet opening while the plastic is hardening in the mold cavity, wherein pressure is exerted on the plastic being kept flowable so that an opening in the plastic in the region of the gas inlet opening is sealed, and the plastic part is removed from the injection mold after reaching a sufficient dimensional stability. In addition, the invention relates to a corresponding device.

34 Claims, 4 Drawing Sheets

Figure 1:
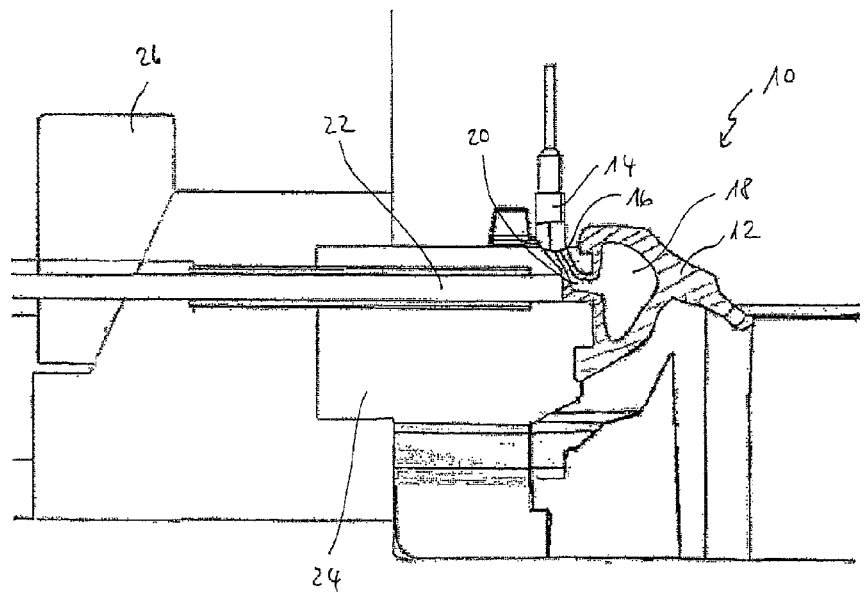

(51) Int. Cl.
*B29C 35/02* (2006.01)
*B29C 45/33* (2006.01)
*B29L 31/30* (2006.01)

(52) U.S. Cl.
CPC ...... *B29C 45/33* (2013.01); *B29C 2045/1718* (2013.01); *B29C 2045/735* (2013.01); *B29C 2045/7393* (2013.01); *B29L 2031/30* (2013.01)

(56) References Cited

U.S. PATENT DOCUMENTS

| | | |
|---|---|---|
| 2010/0072680 A1 | 3/2010 | Fries |
| 2010/0272843 A1 | 10/2010 | Planta Torralba et al. |

FOREIGN PATENT DOCUMENTS

| | | |
|---|---|---|
| EP | 0273769 A2 | 7/1988 |
| EP | 0363948 A1 | 4/1990 |
| JP | H0478510 A | 3/1992 |
| JP | H07100854 A | 4/1995 |
| JP | H09327840 A | 12/1997 |
| JP | H10305459 A | 11/1998 |

\* cited by examiner

METHOD AND DEVICE FOR PRODUCING A PLASTIC PART, ESPECIALLY A PLASTIC PART FOR AN AUTOMOBILE, BY AN INJECTION MOLDING METHOD

RELATED APPLICATIONS

The present application is a National Phase of International Application Number PCT/IB2013/001273 filed Jun. 18, 2013, which claims priority of German Application Number 10 2012 014 013.4 filed Jul. 17, 2012.

The invention relates to a method and device for producing a plastic part, especially a plastic part for an automobile, by an injection molding method. In particular, the invention relates to an internal gas-assisted injection molding method. In this method, gas is introduced under high pressure into the mold cavity after injecting the plastified plastic into the mold cavity of the injection mold. Inside the plastic still able to flow in the mold cavity, this forms a gas bubble and thereby displaces plastic which accordingly completely fills areas of the mold cavity that otherwise could not be filled or would be difficult to fill. A person skilled in the art is aware of such methods.

Due to the design, plastic parts that are produced by an internal gas-assisted injection molding method have an opening that arises from a gas needle or gas channel in the sprue from the injection of the gas. Such an opening is impermissible in any subsequent processing steps such as electroplating, especially chrome plating. Liquids can enter the plastic part through this opening, for example. Since the plastic part generally passes through a number of liquid baths during chrome plating, liquids can be entrained between the baths which causes impermissible contamination of the baths. It is therefore known to seal such openings in the plastic part in a second process step after the plastic part has been removed from the injection mold. Sealing can be performed by adhesion or hot stamping, for example. A disadvantage of this procedure is the additional effort, as well as the necessary procurement of corresponding assembly systems. There is also the risk of increased scrap in the subsequent process to seal the opening.

On the basis of the explained prior art, the objective of the invention is to provide a method and a device of the above-cited type by means of which an opening in the plastic part can be more easily and reliably sealed.

The invention achieves this objective by the subject matter of the independent claims 1 and 18. Advantageous embodiments can be found in the dependent claims, the description and the figures.

On the one hand, the invention achieves the objective by means of a method for producing a plastic part, in particular a plastic part for an automobile, by an injection molding method comprising the steps: Using an injection molding device, plastic in a flowable state is injected into the mold cavity of an injection mold, gas under pressure is injected through a gas inlet opening in the injection mold into the mold cavity of the injection mold by means of a gas injection device so that a gas bubble forms within the still flowable plastic, the plastic is heated and kept flowable, at least in a region neighboring the gas inlet opening, while the plastic is hardening in the mold cavity, wherein pressure is exerted on the plastic being kept flowable so that an opening in the plastic in the region of the gas inlet opening is sealed, and the plastic part is removed from the injection mold after reaching sufficient dimensional stability.

On the other hand, the invention achieves the objective by means of a device for producing a plastic part, especially a plastic part for an automobile, by means of an injection molding method comprising an injection mold with a mold cavity and an injection molding device that is designed to inject plastic in a flowable state into the mold cavity of the injection mold, a gas injecting device that is designed to inject gas under pressure through a gas inlet opening in the injection mold into the mold cavity of the injection mold, a heating device that is designed to heat the plastic hardening in the mold cavity, at least in a region neighboring the gas inlet opening, and keep it flowable, a pressurizing device that is designed to exert pressure on the plastic that is being kept flowable so that an opening in the plastic in the region of the gas inlet opening is sealed, and a removing device by means of which the injection mold can be opened to remove the plastic part from the injection mold.

As mentioned, the invention relates to an internal gas-assisted injection molding method and a corresponding device. As also explained, due to the design, an opening remains in the region of gas inlet opening in the hardening plastic part, created by a gas supply device such as a gas needle or the like. According to the invention, the plastic that is already hardening at this time is heated in the injection mold, keeping the heated plastic section in a flowable state, to then, by exerting sufficient mechanical pressure on this section, close the opening in the injection mold caused by the injection of gas. In particular, a suitable heating device is used to keep the plastic in a flowable state. The pressure on the plastic being kept flowable is in particular exerted in the region of the gas inlet opening in order to seal an opening in the plastic at that location. Of course, any gas needle or the like which is inserted is removed from the plastic beforehand. The gas bubble forming in the plastic part can remain connected to the gas inlet opening in the injection mold after gas injection, especially by means of a passage running through the plastic. This passage is then sealed according to the invention, at least in sections, that is, at least in the region of the gas inlet opening.

The plastic parts manufactured according to the invention are thereby liquid-tight so that they can be easily used for subsequent electroplating, especially chrome plating. According to the invention, the sealing of the plastic part to be manufactured is integrated in the plastic injection mold, especially the injection mold. The opening arising from gas injection is sealed during the plastic cooling time so that there is no overall lengthening of the cycle. A separate process step for closing the opening is eliminated. The effort to close the opening is also minimal since the residual heat available in the injection mold and hence the plastic can still be used. The (re)plastification of a region of the plastic to seal the opening therefore requires little energy. In addition, the plastic part optimally remains in the mold cavity of the injection mold at the time at with the opening is sealed so that complex separate assembly devices, in particular positioning and holding devices, are unnecessary. Furthermore, scrap is reduced since no subsequent sealing process is required.

After the arising opening is sealed and the plastic has sufficiently hardened, the arising plastic part can then be removed from the mold cavity of the injection mold. The removing device of the device according to the invention can also comprise a device for removing the plastic part from the injection mold. Since according to the invention only a small section of the plastic part is kept flowable, the cycle time is not lengthened. In particular, the remaining part of plastic part can harden while the opening is being sealed. The dimensional stability of the plastic part is not affected by being partially kept in a flowable state.

The plastic part can in particular be provided for installation in an automobile. It is also possible to inject the plastic in a flowable state through the gas inlet opening in the injection mold into the mold cavity of the injection mold.

According to one embodiment, the plastic can be heated at least in the region neighboring the gas inlet opening by means of an ultrasonic welding device. An ultrasound device comprising in particular a sonotrode, an ultrasound converter and an ultrasound generator is then placed in the injection mold between the plastic part to be manufactured and the gas injection device. A booster can be provided in a known manner between the ultrasound converter and sonotrode. After the injection molding process and gas injection process, the ultrasonic welding device can be activated for ultrasonic sealing. In a known manner, vibrations introduced into the plastic part by means of interface friction and sound absorption by the ultrasonic welding device, especially the sonotrode, generate melting heat in the section of the plastic part to be heated while mechanical pressure is simultaneously applied. The plastic material becomes flowable in this region, flows and mixes within the ultrasound welding zone and thereby forms a homogenous bond after cooling, wherein the opening in the plastic part is closed.

The pressure on the plastic being kept flowable that is required to close the opening can be exerted by a sonotrode of the ultrasonic welding device. The sonotrode can be movable, especially shiftable in an axial direction. The mobility of the sonotrode is ensured by a suitable drive. According to another embodiment, the sonotrode can be a part of the surfaces forming the mold cavity. At least a part of the injection mold can then be distanced from the sonotrode before the sonotrode is excited to vibrate ultrasonically to heat the plastic, at least in the region neighboring the gas inlet opening.

In this embodiment, the sonotrode of the ultrasonic welding device forms a part of the surfaces forming the plastic cavity, especially when axially movable into a specific axial position while injecting the flowable plastic and gas into the mold cavity. It is initially fixed in position during the injection of the flowable plastic and gas. A part of the injection mold can then be moved away from the mold cavity in order to partially expose the sonotrode. This gives the sonotrode sufficient freedom of movement to generate the interface friction with the plastic of the plastic part by means of its vibration necessary for ultrasonic welding after the ultrasonic generator is activated. The plastic part is thereby held in the injection mold free of vibration so that the ultrasonic vibrations of the sonotrode can be optimally exploited for the ultrasonic welding process. The sonotrode simultaneously exerts mechanical pressure on the flowable plastic by moving axially in order to close the opening in the plastic. It is also possible that the plastic is pressed in an axial direction (back) into the mold cavity through the sonotrode.

The heating device can also comprise a heated sleeve and a plunger that is movable in an axial direction and guided in the sleeve. The sleeve can for example be supplied hot gas, especially hot air, from a hot gas source. The heating device can then be a hot gas riveting device. The sleeve with the plunger is then placed in the injection mold between the plastic part and the gas injection device. The sleeve in which the plunger is located is for example connected to a hot air source by means of a hole. Shortly before the end of the process of injecting gas into the mold cavity, the hot air source can be activated so that hot air passes through the hole into the sleeve in order to heat it. By heating the sleeve, the plastic in a certain section can be converted back into a flowable state, wherein sufficient mechanical pressure can be exerted on the plastic to close the opening by activating the plunger.

The plunger can for example be a metal plunger, especially a steel plunger. This ensures efficient thermal conduction. The sleeve can also consist of a metal, such as steel, to achieve efficient thermal conduction. It is heated and accordingly forms part of the heating device. In addition, the sleeve prevents significant thermal energy loss to the outside. The axial mobility of the plunger is ensured by a suitable drive. The inner contour of the sleeve can tightly accommodate the outer contour of the plunger. In particular, the inner diameter of a for example hollow cylindrical sleeve can be slightly larger than the outer diameter of a for example cylindrical plunger. The sleeve can be held in or on the injection mold by means of one or more grooves and corresponding spring elements or other retaining elements. In order to reduce the heating time for the section of plastic to be kept in a flowable state, the sleeve can be provided with at least one additional heating element such as an electrical heating element, or also an infrared or red light heating element. Alternatively or in addition, the plunger can also be provided with such an additional heating element.

The plunger can form a part of the surfaces forming the mold cavity while injecting the flowable plastic and the gas into the mold cavity. The gas injection device can then guide the gas through the sleeve, wherein the plunger is at least partially withdrawn from the sleeve while the gas is being injected so that a part of the still flowable plastic enters the sleeve for example displaced by the injected gas, wherein the plastic is kept flowable in the sleeve by means of the heated sleeve. Then the plunger can be moved in an axial direction in the sleeve, wherein the pressure is exerted that is required to seal the opening in the region of the gas inlet opening.

The gas is injected in this case through the sleeve. The plunger is withdrawn sufficiently from the sleeve so that the gas can flow through the sleeve into the mold cavity. A part of the still flowable plastic is then pressed out of the mold cavity into the sleeve by the injected gas. A particularly effective introduction of heat into the plastic located within the sleeve is achieved by means of the heated sleeve. When subsequently moving axially within the sleeve, the plunger presses the plastic into the sleeve and can in particular (partially or completely) press it out of the sleeve and into the mold cavity. This closes the opening through which the gas was previously injected into the plastic.

According to another embodiment, the plastic can be heated at least in the region neighboring the gas inlet opening by means of an electrical heating device, especially a resistance welding device. The electrical heating device can comprise an electrically heated hot plunger which, after the gas is injected, is moved in an axial direction toward the gas inlet opening, so that the plastic is heated and kept flowable at least in the region neighboring the gas inlet opening, and wherein the pressure is exerted that is necessary to close the opening in the plastic in the region of the gas inlet opening. The hot plunger is hence moved toward the plastic in the region of the opening to be closed, and this closes the opening. The hot plunger can in particular be heated by means of an electrical resistance heating device. While injecting the flowable plastic and the gas into the mold cavity, that is, before axially moving the hot plunger toward the plastic, the hot plunger can form a part of the surfaces forming the mold cavity.

In addition, at least a part of the injection mold can be distanced from the hot plunger before the hot plunger is moved in an axial direction toward the opening in the plastic. In addition, after closing the opening in the plastic located in the region of the gas inlet opening, a cooling gas, especially cool air, can be conducted through the hot plunger toward the closed opening in the plastic. This accelerates the sealing of the opening.

The plastic part can be chrome-plated after being removed from the injection mold. The device according to the invention can have a corresponding chrome plating device.

The device according to the invention can be suitable for carrying out the method according to the invention. Accordingly, the method according to the invention may be carried out by the device according to the invention.

Figure 2:
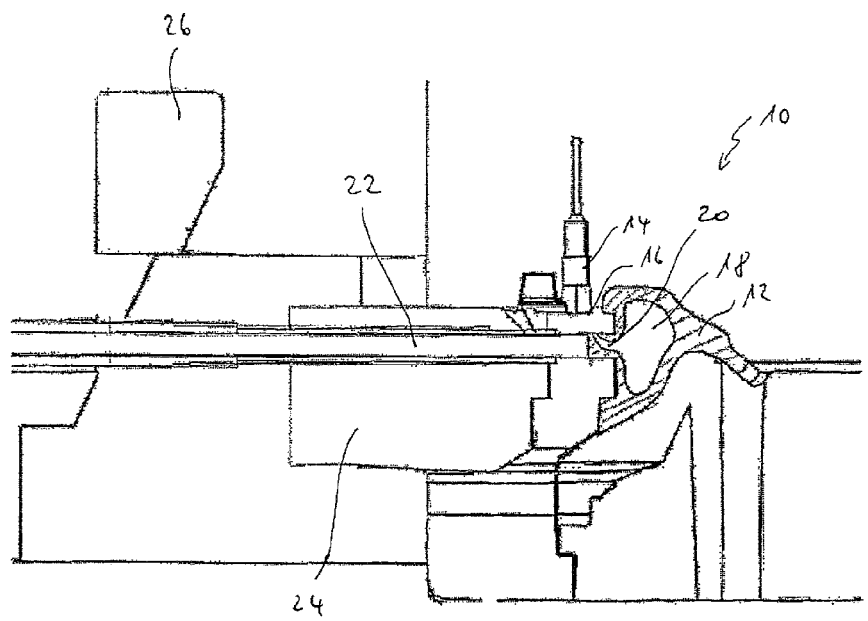
Figure 3:
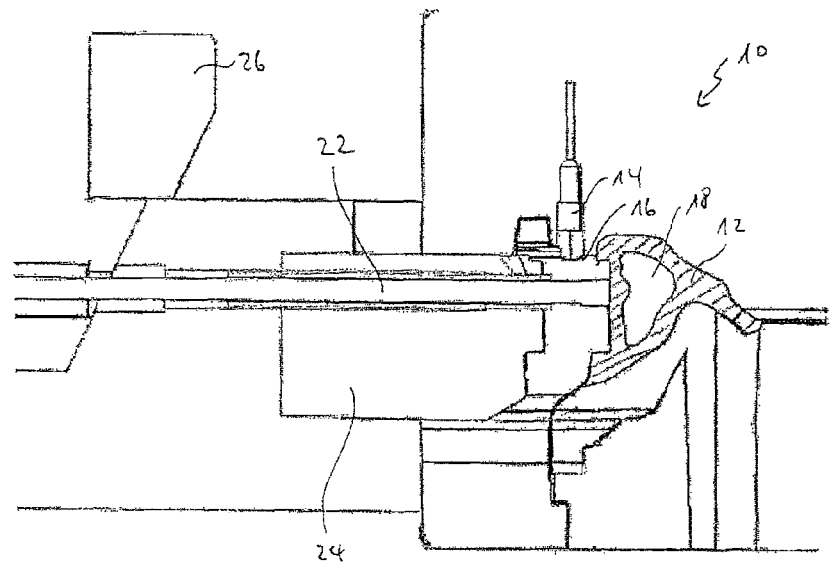
Figure 4:
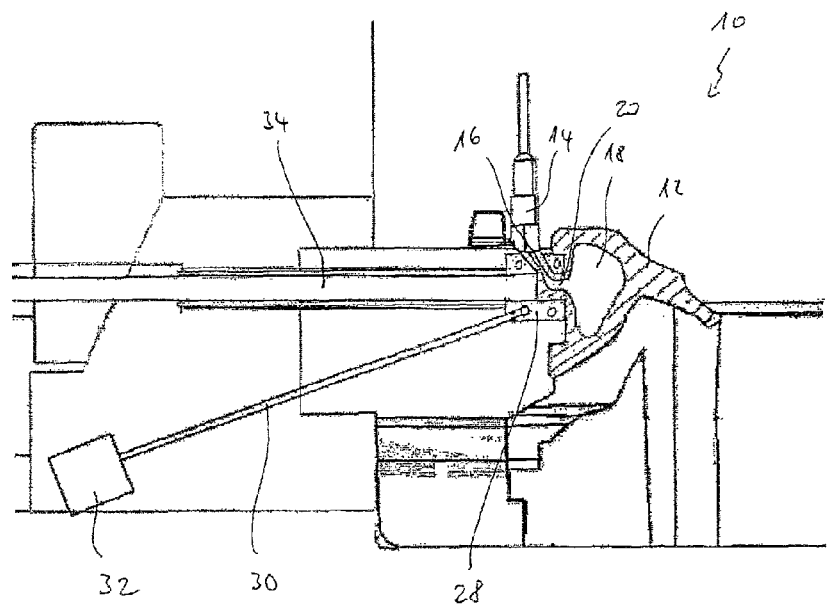
Figure 5:
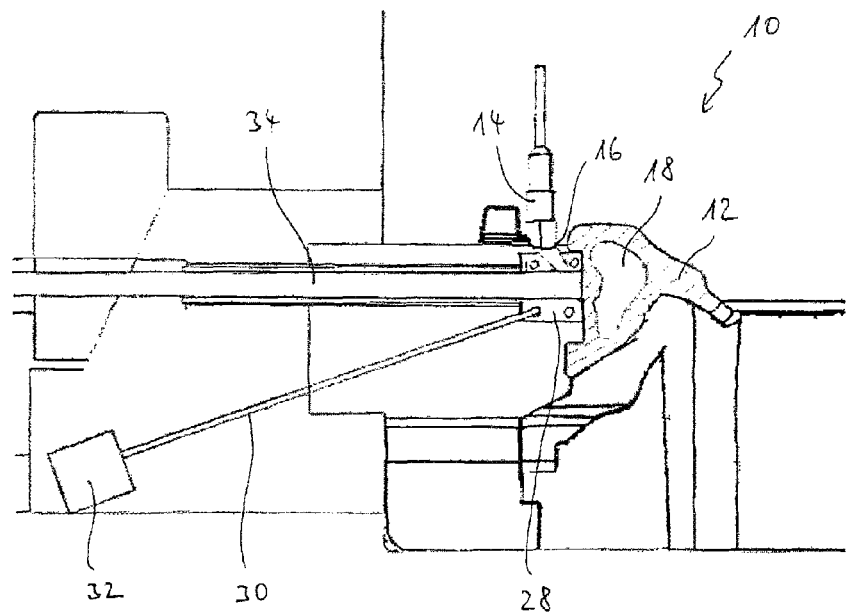
Figure 6:
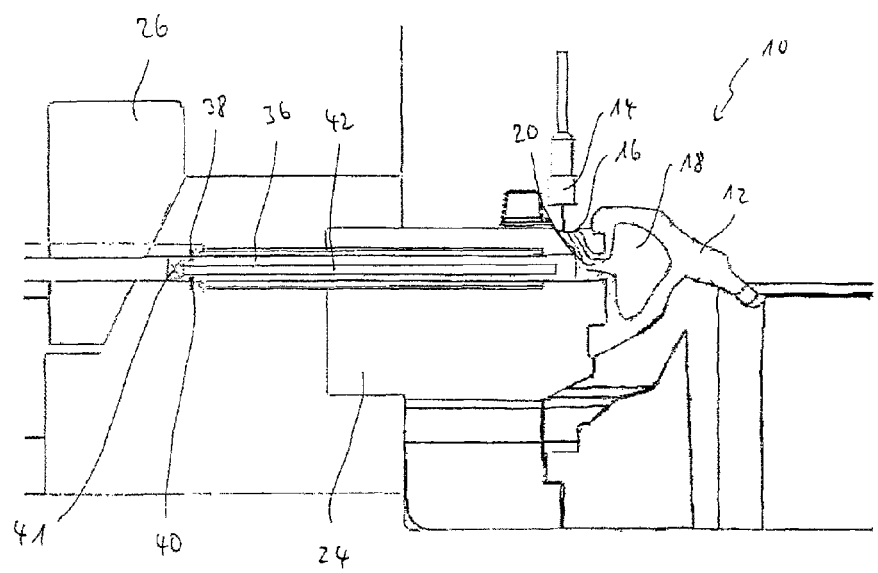
Figure 7:
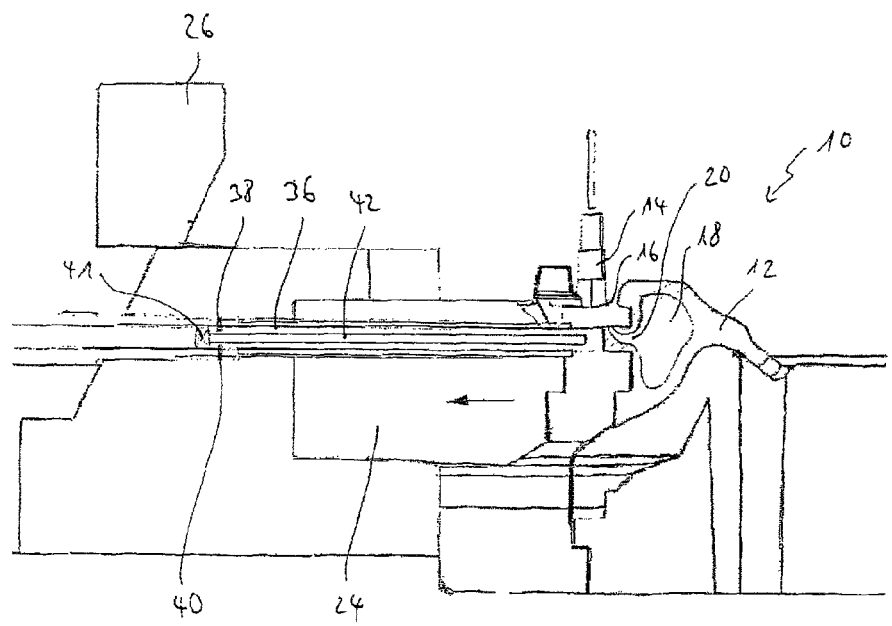
Figure 8:
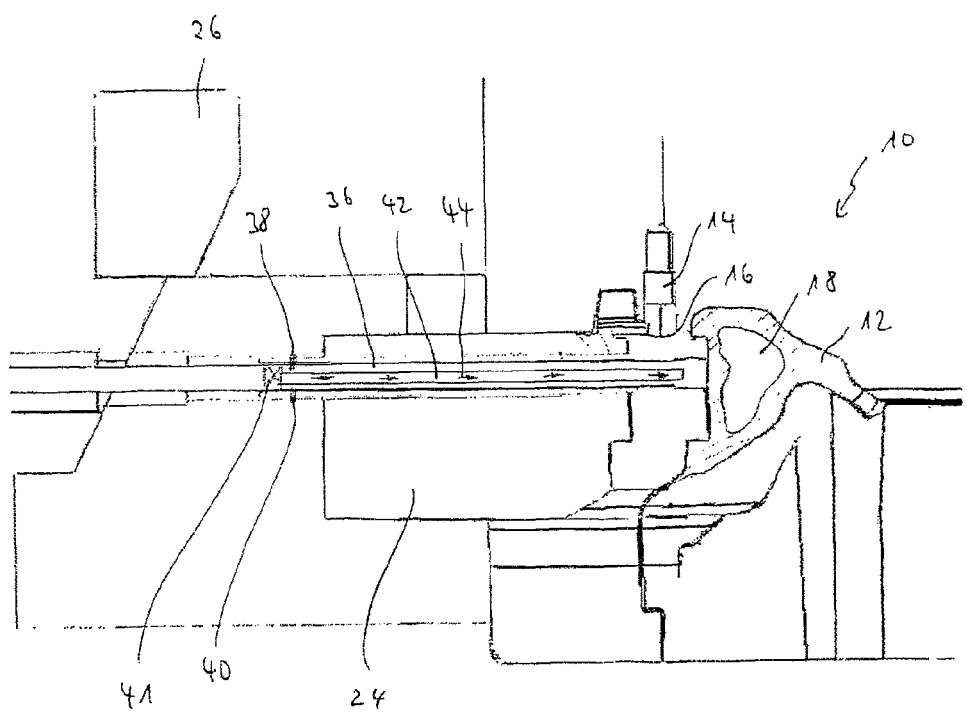

One exemplary embodiment of the invention is explained below in greater detail using figures. They show schematically:

FIG. 1 A sectional representation of a device according to the invention according to a first exemplary embodiment in a first operating mode in a sectional view, FIG. 2 The representation from FIG. 1 in a second operating mode, FIG. 3 The representation from FIG. 1 in a third operating mode, FIG. 4 A sectional representation of a device according to the invention according to a second exemplary embodiment in a first operating mode in a sectional view, FIG. 5 The representation from FIG. 4 in a second operating mode, FIG. 6 A sectional representation of a device according to the invention according to a third exemplary embodiment in a first operating mode in a sectional view, FIG. 7 The representation from FIG. 6 in a second operating mode, and FIG. 8 The representation from FIG. 6 in a third operating mode.

If not otherwise specified, the same reference numbers indicate the same objects in the figures. Various parts of an injection mold 10 are shown in FIGS. 1 to 3 that form a mold cavity for producing a plastic injection molded part in an internal gas-assisted injection molding method. In FIG. 1, plastic 12 in a flowable state has already been injected into this mold cavity. An injection mold device which is not shown in greater detail in the figures is provided for this purpose. In the first operating mode in FIG. 1, gas is also introduced through a gas inlet opening 16 under high pressure into the mold cavity by means of a gas needle 14 of the gas injection device. Within the plastic 12, this has formed a gas bubble 18 which is connected via a gas channel 20 to the gas inlet opening 16, and an undesirable opening has formed. In the portrayed example, the plastic 12 was also injected through the gas inlet opening 16 into the mold cavity.

In FIGS. 1 to 3, a sonotrode 22 of an ultrasonic welding device can also be seen that is substantially cylindrical in the portrayed example and can be moved in an axial direction by means of a drive (not shown in greater detail). The ultrasonic welding device also comprises an ultrasound generator (not shown), an ultrasound converter (also not shown) as well as a booster, if applicable. In the first operating mode shown in FIG. 1, the face of the sonotrode 22, which can be seen on the right in FIG. 1, forms a part of the surfaces of the injection mold 10 forming the mold cavity for the plastic 12. To assume the second operating mode shown in FIG. 2, parts of the injection mold 10 are removed from the sonotrode 22, at least in sections. In particular, the first mold part 24 of the injection mold 10 is moved away from the mold cavity and hence also from the end face of the sonotrode 22. In addition, the second mold part 26 of the injection mold is moved upward. The sonotrode 22 is thereby given sufficient freedom of movement to be excited by the ultrasound generator of the ultrasonic welding device to vibrate ultrasonically. The ultrasonic vibrations cause interface friction, especially in the region of contact between the sonotrode 22 and plastic 12, and cause sound to be absorbed by the plastic 12, which in turn causes the plastic 12 to melt in a section near the sonotrode 22. The remaining plastic 12 that is already hardening at this time is held in the mold cavity without vibrating at the same time. The plastic 12 is therefore flowable adjacent to the sonotrode 22.

The sonotrode 22 is then moved in an axial direction toward the plastic 12 by a drive (not shown) to enter the third operating mode shown in FIG. 3, so that corresponding pressure is exerted on the plastic 12. As can be seen in FIG. 3, this causes the gas channel 20 to close along with the opening in the plastic part to be produced that was generated by the internal gas-assisted injection molding method. Then the injection mold can be opened, and the finished plastic part can be removed.

A second exemplary embodiment of a device according to the invention will be explained with reference to FIGS. 4 and 5. This largely corresponds to the exemplary embodiment in FIGS. 1 to 3. It differs, however, in terms of the heating and in terms of keeping the plastic 12 flowable in the region neighboring the gas inlet opening 16, as well as the exertion of mechanical pressure.

As can be seen in FIGS. 4 and 5, the heating device in this case comprises a sleeve 28 that is connected to a hot gas source, in this case a hot air source 32, by means of a connecting line 30. In particular, the sleeve 28 possesses at least one hole through which the hot air provided by the hot air source 32 is supplied to the sleeve 28 in order to heat it. In the portrayed example, the sleeve 28 is designed as a hollow cylinder. A plunger 34 is guided in the sleeve 28 and can move in an axial direction by means of a suitable drive. In the portrayed example, the plunger 34 is designed cylindrical and sits substantially tight within the sleeve 28. Both the sleeve 28 and the plunger 34 can for example consist of a metal material such as steel. In the first operating mode shown in FIG. 4 that accordingly corresponds to the first operating mode of the device from FIG. 1, the end face of the plunger 34 that can be seen on the right in FIG. 4 forms a part of the surfaces forming the mold cavity for the plastic 12. The plastic 12 is also within the sleeve 28. The gas channel 20 connecting the gas bubble 18 to the gas inlet opening 16 can also be seen. It can also be seen that the plastic 12 was also conducted through the gas inlet opening 16 into the mold cavity in this case as well.

In the first operating mode shown in FIG. 4, the plunger 34 is partially withdrawn from the sleeve 28 away from the mold cavity, that is, to the left in FIG. 4. During or after concluding the gas injecting process, the hot air source 32 is activated to thereby heat the sleeve 28. In particular, the plastic section located within the sleeve 28 is also thereby heated and kept in a flowable state. It is also noted that both the plunger 34 as well as the sleeve 28 can possess additional heating devices to support the heating effect, if applicable.

The plunger 34 is then moved in an axial direction towards the mold cavity, that is, from left to right in FIGS. 4 and 5, until reaching the second operating mode shown in FIG. 5. The plunger 34 thereby displaces in particular the section of the plastic 12 located within the sleeve 28 and closes the gas channel 20 and hence the undesirable opening.

After the plastic 12 has sufficiently hardened, the plastic part produced in this manner can then be removed from the opened injection mold 10.

FIGS. 6 to 8 show a third exemplary embodiment of a device according to the invention that also largely corresponds to the exemplary embodiment in FIGS. 1 to 3. It differs, however, in terms of the heating and flow of the plastic 12 in the region neighboring the gas inlet opening, as well as the exertion of mechanical pressure. The heating device in this example comprises an electrically heated hot plunger 36. The reference numbers 38, 40 are terminals for electrically heating the hot plunger 36, for example, for resistance heating. Reference number 41 identifies an insulating element. The hot plunger 36 can move in an axial direction. A suitable drive device is provided. In the hot plunger 36, which is cylindrical for example, a preferably concentric supply line 42 is formed through which a cooling gas, preferably cooling air, can be conducted by means of a cooling device (not shown) as illustrated in FIG. 8 by the arrows 44.

In the first operating mode shown in FIG. 6, the end face of the hot plunger 36 which can be seen on the right in FIG. 6 forms a part of the surfaces of the injection mold 10 forming the mold cavity for the plastic 12. As already explained above with reference to the first exemplary embodiment, parts of the injection mold 10 are distanced at least in sections from the hot plunger 36 to assume the second operating mode shown in FIG. 7. In particular, the first mold part 24 of the injection mold 10 is moved away from the mold cavity and hence also from the end face of the hot plunger 36. In addition, the second mold part 26 of the injection mold is also moved upward. The hot plunger 36 is thereby given freedom of movement for its axial movement. In addition, the hot plunger 36 is released from contact with guide components for guiding the hot plunger 36 or mold parts of the injection mold so that it can optimally exert its heating effect on the plastic 12. The electrically heated hot plunger 36 ensures that the plastic 12 remains flowable at least in the region of the opening 20. Finally, to reach the third operating mode shown in FIG. 8, the hot plunger 36 is moved in an axial direction by the drive device (not shown) toward the plastic 12 to exert corresponding pressure on the plastic 12. As can be seen in FIG. 8, this causes the gas channel 20 to close along with the opening in the plastic part to be produced that was generated by the internal gas-assisted injection molding method. In this third operating mode, a cooling gas can be supplied by means of the cooling device to the plastic 12 in the region of contact with the hot plunger 36. This cools the welding site in the region where the plastic 12 is sealed which accelerates the process.

In all of the embodiments of the invention, a liquid-tight plastic part is obtained easily and reliably that can then be chrome-plated, for example.

The invention claimed is:

1. A method for producing a plastic part, with an injection molding method comprising the steps:
   Plastic is injected in a flowable state by means of an injection molding device into a mold cavity of an injection mold,
   Gas under pressure is injected through a gas inlet opening of the injection mold into the mold cavity of the injection mold by means of a gas injection device so that a gas bubble forms within the still flowable plastic,
   The plastic is heated and kept flowable, at least in a region neighboring the gas inlet opening, while the plastic is hardening in the mold cavity, wherein pressure is exerted on the plastic being kept flowable so that an opening in the plastic in the region of the gas inlet opening is sealed,
   The plastic part is removed from the injection mold after reaching sufficient dimensional stability, wherein
   at least one of:
   (i) the plastic is heated at least in the region neighboring the gas inlet opening by means of an ultrasonic welding device, and wherein the pressure is exerted on the plastic being kept flowable by means of a sonotrode of the ultrasonic welding device;
   (ii) the heating device comprises a heated sleeve and a plunger that can be moved in an axial direction and guided in the sleeve; or
   (iii) the plastic is heated at least in the region neighboring the as inlet opening by means of an electrical heating device.

2. The method according to claim 1, wherein the plastic is heated at least in the region neighboring the gas inlet opening by means of the ultrasonic welding device.

3. The method according to claim 2, wherein the pressure is exerted on the plastic being kept flowable by means of the sonotrode of the ultrasonic welding device.

4. The method according to claim 3, wherein the sonotrode forms a part of the mold surfaces forming the mold cavity.

5. The method according to claim 3, wherein at least a part of the injection mold is distanced from the sonotrode before the sonotrode is excited to vibrate ultrasonically to heat the plastic, at least in the region neighboring the gas inlet opening.

6. The method according to claim 1, wherein the heating device comprises the heated sleeve and the plunger that can be moved in the axial direction and guided in the sleeve.

7. The method according to claim 6, wherein the sleeve is supplied hot gas from a hot gas source.

8. The method according to claim 7, wherein the sleeve is provided with at least one additional heating element.

9. The method according to claim 6, wherein the plunger forms a part of the surfaces forming the mold cavity when the flowable plastic and the gas are being injected into the mold cavity.

10. The method according to claim 9, wherein the gas injection device supplies the gas through the sleeve, wherein the plunger is at least partially withdrawn from the sleeve while the gas is being injected so that a part of the still flowable plastic enters the sleeve in which it is kept flowable by means of the heated sleeve.

11. The method according to claim 10, wherein the plunger is then moved in an axial direction into the sleeve, wherein the pressure is exerted that is necessary to close the opening in the plastic in the region of the gas inlet opening.

12. The method according to claim 1, wherein the plastic is heated at least in the region neighboring the gas inlet opening by means of an electrical heating device.

13. The method according to claim 12, wherein the electrical heating device comprises an electrically heated hot plunger which, after the gas is injected, can move in an axial direction toward the gas inlet opening so that the plastic is heated and kept flowable at least in the region neighboring the gas inlet opening, and wherein the pressure is exerted that is necessary to close the opening in the plastic in the region of the gas inlet opening.

14. The method according to claim 12, wherein the hot plunger forms a part of the surfaces forming the mold cavity when the flowable plastic and the gas are being injected into the mold cavity.

15. The method according to claim 12, wherein at least a part of the injection mold can be distanced from the hot plunger before the hot plunger is moved in an axial direction toward the gas inlet opening.

16. The method according to claim 12, wherein, after closing the opening in the plastic located in the region of the gas inlet opening, a cooling gas, is conducted through the hot plunger toward the closed opening in the plastic.

17. The method according to claim 1, wherein the plastic part is chrome-plated after being removed from the injection mold.

18. A device for producing a plastic part, with an injection molding method comprising:
- an injection mold with a mold cavity and an injection molding device that is designed to inject plastic in a flowable state into the mold cavity of the injection mold,
- a gas injecting device that is designed to inject gas under pressure through a gas inlet opening of the injection mold into the mold cavity of the injection mold,
- a heating device that is designed to heat the plastic hardening in the mold cavity, at least in a region neighboring the gas inlet opening, and keep it flowable,
- a pressurizing device that is designed to exert pressure on the plastic that is being kept flowable so that an opening in the plastic in the region of the gas inlet opening is sealed, and
- a removing device by means of which the injection mold can be opened to remove the plastic part from the injection mold, wherein
- at least one of:
  - (i) the heating device is an ultrasonic welding device, and wherein the pressurizing device comprises a sonotrode of the ultrasonic welding device;
  - (ii) the heating device comprises a positioning device that is designed to distance at least a part of the injection mold from the sonotrode before the sonotrode is excited to vibrate ultrasonically to heat the plastic, at least in the region neighboring the as inlet opening;
  - (iii) the heating device comprises a heated sleeve and a plunger that can be moved in an axial direction and guided in the sleeve;
  - (iv) the heating device comprises a chrome plating device for chrome plating a plastic part after being removed from the injection mold; or
  - (v) the heating device comprises an electrical heating device.

19. The device according to claim 18, wherein the heating device is the ultrasonic welding device.

20. The device according to claim 19, wherein the pressurizing device comprises the sonotrode of the ultrasonic welding device.

21. The device according to claim 20, wherein the sonotrode forms a part of the mold surfaces forming the mold cavity.

22. The device according to claim 18, wherein the device comprises the positioning device that is designed to distance at least the part of the injection mold from the sonotrode before the sonotrode is excited to vibrate ultrasonically to heat the plastic, at least in the region neighboring the gas inlet opening.

23. The device according to claim 18, wherein the heating device comprises the heated sleeve and the plunger that can be moved in the axial direction and guided in the sleeve.

24. The device according to claim 23, wherein the sleeve is connected to a hot gas source.

25. The device according to claim 24, wherein the sleeve is provided with at least one additional heating element.

26. The device according to claim 23, wherein the plunger, in a first axial position, forms a part of the surfaces forming the mold cavity.

27. The device according to claim 26, wherein the gas injection device is connected to a gas supply opening of the sleeve, and the plunger, when in a second axial position, is at least partially withdrawn from the sleeve so that a part of the still flowable plastic can enter the sleeve in which it can be kept flowable by means of the heated sleeve.

28. The device according to claim 27, wherein the plunger can then move again in an axial direction in the sleeve in order to exert the pressure that is necessary to close the opening in the plastic in the region of the gas inlet opening.

29. The device according to claim 18, wherein the device also comprises the chrome plating device for chrome plating the plastic part after being removed from the injection mold.

30. The device according to claim 18, wherein the heating device comprises the electrical heating device.

31. The device according to claim 30, wherein the electrical heating device comprises an electrically heated hot plunger which can move axially toward the gas inlet opening to heat the plastic and keep it flowable at least in the region neighboring the gas inlet opening, wherein the pressure is exerted that is necessary to close the opening in the plastic in the region of the gas inlet opening.

32. The device according to claim 30, wherein the hot plunger, in a first axial position, forms a part of the surfaces forming the mold cavity.

33. The device according to claim 30, wherein it comprises a positioning device that is designed to distance at least part of the injection mold from the hot plunger before the hot plunger is moved in an axial direction toward the gas inlet opening.

34. The device according to claim 30, wherein the electrical heating device has a cooling device to supply a cooling gas, through the hot plunger to the closed opening in the plastic.

* * * * *